US011603095B2

(12) United States Patent
Schleede et al.

(10) Patent No.: US 11,603,095 B2
(45) Date of Patent: Mar. 14, 2023

(54) COLLISION AVOIDANCE PLANNING SYSTEM

(71) Applicant: Zoox, Inc., Foster City, CA (US)

(72) Inventors: Peter Scott Schleede, Foster City, CA (US); Prateek Chandresh Shah, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 183 days.

(21) Appl. No.: 17/086,047

(22) Filed: Oct. 30, 2020

(65) Prior Publication Data

US 2022/0135026 A1 May 5, 2022

(51) Int. Cl.
| | |
|---|---|
| *B60W 30/09* | (2012.01) |
| *G08G 1/16* | (2006.01) |
| *B60W 30/095* | (2012.01) |
| *B60W 50/00* | (2006.01) |
| *G05D 1/02* | (2020.01) |

(52) U.S. Cl.
CPC ........ *B60W 30/09* (2013.01); *B60W 30/0953* (2013.01); *B60W 30/0956* (2013.01); *B60W 50/0098* (2013.01); *G05D 1/0214* (2013.01); *G08G 1/166* (2013.01); *B60W 2050/0031* (2013.01); *B60W 2520/10* (2013.01); *B60W 2520/105* (2013.01); *B60W 2520/12* (2013.01); *B60W 2520/125* (2013.01); *B60W 2554/4041* (2020.02); *B60W 2554/4044* (2020.02); *G05D 2201/0213* (2013.01)

(58) Field of Classification Search
CPC ............. B60W 30/09; B60W 30/0953; B60W 30/0956; B60W 50/0098; B60W 2554/4041; B60W 2554/4044; B60W 2050/0031; B60W 2520/10; B60W 2520/105; B60W 2520/12; B60W 2520/125; G05D 1/0214; G05D 2201/0213; G08G 1/166
See application file for complete search history.

(56) References Cited

U.S. PATENT DOCUMENTS

| | | | | |
|---|---|---|---|---|
| 11,292,463 | B2 * | 4/2022 | Hardy | .................... G08G 1/165 |
| 2010/0191391 | A1 | 7/2010 | Zeng | |
| 2017/0120803 | A1 * | 5/2017 | Kentley | ................ B60L 3/0007 |

(Continued)

FOREIGN PATENT DOCUMENTS

GB 2570887 A 8/2019

OTHER PUBLICATIONS

PCT Search Report and Written Opinion for PCT Application No. PCT/US21/56748, dated Jan. 13, 2022, 10 pgs.

*Primary Examiner* — Jeff A Burke
*Assistant Examiner* — Mohamad O El Sayah
(74) *Attorney, Agent, or Firm* — Lee & Hayes, P.C.

(57) ABSTRACT

Techniques for controlling a vehicle based on a collision avoidance algorithm are discussed herein. The vehicle receives sensor data and can determine that the sensor data represents an object in an environment through which the vehicle is travelling. A computing device associated with the vehicle determines a collision probability between the vehicle and the object at predicted locations of the vehicle and object at a first time. Updated locations of the vehicle and object can be determined, and a second collision probability can be determined. The vehicle is controlled based at least in part on the collision probabilities.

20 Claims, 6 Drawing Sheets

(56) References Cited

U.S. PATENT DOCUMENTS

| | | |
|---|---|---|
| 2019/0243371 A1 | 3/2019 | Nister et al. |
| 2019/0389459 A1* | 12/2019 | Berntorp ......... B60W 30/18163 |
| 2020/0346643 A1* | 11/2020 | Woon ................ B60W 30/0956 |
| 2021/0209388 A1* | 7/2021 | Ciftci ..................... G06V 40/45 |
| 2021/0354729 A1* | 11/2021 | Ng ..................... B60W 60/0018 |
| 2021/0387643 A1* | 12/2021 | Hari .................... B60W 30/095 |
| 2022/0057803 A1 | 2/2022 | Sorin et al. |

* cited by examiner

COLLISION AVOIDANCE PLANNING SYSTEM

BACKGROUND

Various methods, apparatuses, and systems are utilized by autonomous vehicles to guide such autonomous vehicles through environments which may have other objects, including other vehicles. In some examples, prediction techniques can be used to determine a likelihood of a collision between two entities in an environment. Current prediction techniques may have limitations including a lack of ability to adapt to space constrictions associated with the environment. The limitations in the current prediction techniques can result in the autonomous vehicle and another vehicle being unable to pass each other while avoiding a collision.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
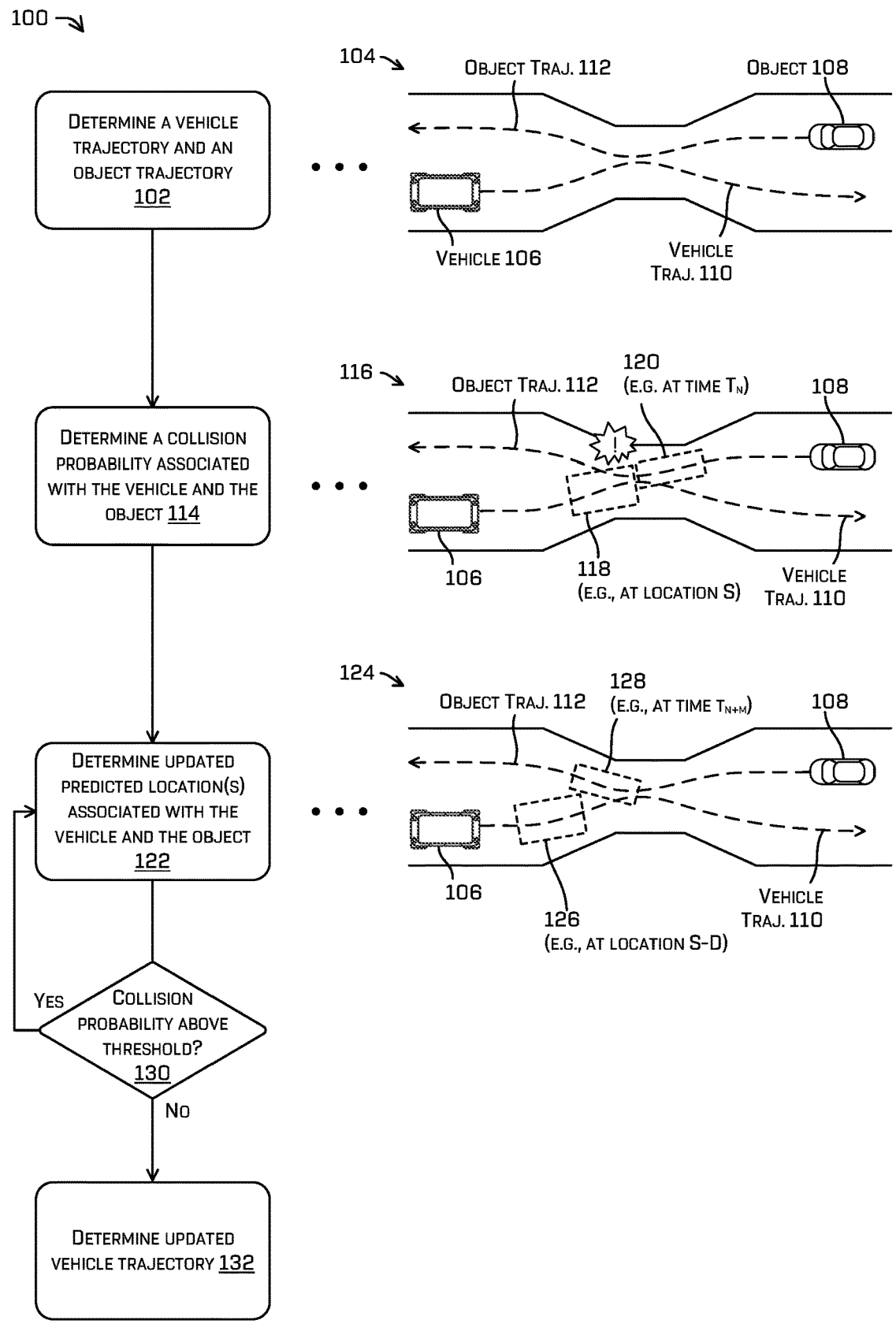
FIG. 1 is a pictorial flow diagram of an example process of determining a collision probability and controlling a vehicle based at least in part on the collision probability.

Techniques for evaluating trajectories of vehicles and objects to avoid collisions are discussed herein. In some examples, a vehicle, such as an autonomous vehicle, can determine a trajectory for the vehicle to traverse an environment. The vehicle can also determine an object trajectory for an object (e.g., another vehicle) in the environment. The vehicle can predict position(s) of the vehicle and the object based on the vehicle trajectory and the object trajectory. Upon determining a collision probability associated with a predicted intersection (e.g., an intersection between the vehicle trajectory and the predicted object trajectory, a distance between the vehicle and the object less than a threshold, an overlap between the vehicle and the object greater than a threshold, etc.), a planning system of the vehicle can determine a location for the vehicle along the vehicle trajectory to avoid a collision while furthering progress for the object along the object trajectory. For example, the planning system can "back up" the vehicle along the vehicle trajectory and can "step forward" the object along the object trajectory until the planning system determines a probability of a collision is below a threshold. The planning system can alter the vehicle trajectory to slow the vehicle or to stop the vehicle at a location in an environment to avoid a collision.

In some examples, the planning system of the vehicle can utilize a collision avoidance algorithm to reduce a risk of a collision with the object in the environment. The vehicle can determine a probability of a collision based on the collision avoidance algorithm. The probability of the collision can be output by the collision avoidance algorithm to control the vehicle. The collision avoidance algorithm can utilize at least one model (e.g., geometric model, machine learned mode, etc.) to minimize an amount of computation required for task and motion planning associated with the vehicle.

In some instances, the probability of the collision can be determined based on the vehicle and object being positioned in a constricted area of the environment. The vehicle can be positioned partially or completely in a lane of a road. The lane in which the vehicle is positioned can be adjacent to a lane in which the object is partially or completely positioned. The lane in which the vehicle is positioned can be utilized to allow movement of traffic in a direction that is opposite (e.g., oncoming) to movement of traffic in the lane in which the object is positioned. The road including the lane in which the vehicle is positioned and the lane in which the object is positioned can be at least partially constricted.

The collision avoidance algorithm can determine the risk of the collision based on sensor data received by sensors of the vehicle. The sensor data can include data associated with each of the vehicle and an object (e.g., vehicle, pedestrian, bicycle, animal, parked car, tree, building, and the like) in the environment. The sensor data can include information associated with physical characteristics, a location, and/or a movement associated with each of the vehicle and the object. Additional information associated with an object can be determined based on the sensor data, such as a position, a velocity, an acceleration, a direction, etc. of each of the vehicle and the object. The sensor data can be utilized to generate inputs for the collision avoidance algorithm. By way of example, the inputs can include the trajectories of the vehicle and the object, as well as a time period for searching for a collision, a time step size, a distance step size, probability thresholds, etc.

In some cases, the collision avoidance algorithm can utilize various geometric models which can vary based on at least one of processing power, accuracy, tendency to underestimate/overestimate a collision probability, etc. In some examples, a geometric model can be utilized to determine intersections and/or collision probabilities associated with the vehicle and the object. An intersection and/or collision probability can be determined based on a predicted location of each of the vehicle and the object. The predicted locations of the vehicle and the object at the intersection can be determined based on trajectories of the vehicle and the object. The planning system can determine the predicted locations at the intersection based on a geometric representation of each of the vehicle and the object. The planning system can determine an overlap between the geometric representation of the vehicle and the geometric representation of the object, as well as probability distribution(s) associated with the object. The overlap can be determined for predicted positions of the vehicle and the object associated with the intersection, and for subsequent predicted positions of the vehicle and the object determined after "backing up" of the vehicle and "stepping forward" of the object.

Starting with an initial state (e.g., associated with a collision or a collision probability between the vehicle and the object above a threshold), the collision avoidance algorithm can be utilized to simulate "stepping backward" the trajectory associated with the vehicle (e.g., simulating the vehicle slowing down (e.g., deceleration)) at the intersection. In those examples, "stepping backward" the trajectory associated with the vehicle can include determining vehicle characteristics associated with a new location prior to a location at the initial state. Next, the collision avoidance algorithm can simulate "stepping forward" the trajectory of the object (e.g., simulating the object changing its location). In those examples, the "stepping forward" the trajectory of the object can include determining object characteristics associated with the object at a new time subsequent to the time of the initial state. Next, the collision avoidance algorithm can determine whether the geometric representation of the vehicle at the new time overlaps with the geometric representation of the object at the new position. Then the "stepping back" and the "stepping forward" can be repeated until no overlap is determined or until a collision probability is below a threshold value. The vehicle can be controlled to ensure that there is no collision and to ensure that the object can make progress.

In some examples, the probability of the collision can be determined based on the spatial relationships between the geometric representation of the vehicle and the geometric representation of the object. The probability of collision can be determined based on a location probability distribution associated with the object. Location probability distributions can be associated with the object as uncorrelated probability distributions, such as two uncorrelated probability distributions including a probability distribution in a first direction (e.g., over an x-axis) and a probability distribution in a second direction (e.g., over a y-axis). Location probability distributions can be associated with the object as a single correlated probability distribution in both directions (e.g., over both the x-axis and the y-axis). For example, an object, such as another vehicle, can be represented as a rectangle based on the extents of the object as determined from sensor data. A collision probability can be determined based on an integration associated with each probability distribution and a geometric model associated with the vehicle. The location probability distributions are not limited to the above described geometric models and can include one or more other models. The other model(s) can include, for example, models based on a velocity associated with the object, probabilities over velocities associated with the object, an uncertainty over acceleration associated with the object, an uncertainty over steering associated with the object, an uncertainty over extents of the object itself, heat maps associated with the object, tubes associated with locations of the object, etc. Examples of probability distributions based on heat maps are discussed in, for example, U.S. patent application Ser. No. 16/151,607 titled "Trajectory Prediction on Top-Down Scenes" and filed Oct. 4, 2018, which is incorporated by reference herein in its entirety.

In some examples, the collision avoidance algorithm can utilize a machine learned model to determine the probability of collision associated with the positions of the vehicle and the object. In some examples, the machine learned model can include a convolutional neural network (CNN), which may include one or more recurrent neural network (RNN) layers, such as, but not limited to, long short-term memory (LSTM) layers. The probability of the collision associated with the vehicle can be determined based on each of the positions of the vehicle and the object at the intersection. The probability of the collision associated with the vehicle can be determined based on each of the positions of the vehicle and the object after the "stepping back" of the vehicle and the "stepping forward" of the object. A predicted velocity associated with the vehicle can be determined based on the positions of the vehicle and the object at the intersection. A predicted acceleration associated with the vehicle can be determined based on the velocity and positions of the vehicle and the object after the "stepping back" of the vehicle and the "stepping forward" of the object.

In some examples, the collision avoidance algorithm can be utilized to determine an acceleration to control the vehicle, based on the predicted velocity and/or the predicted location associated with the vehicle. The acceleration to control the vehicle can be determined based on options to i) stop the vehicle, or ii) modify a velocity of the vehicle to be a reference velocity at a location along the trajectory of the vehicle. The acceleration to control the vehicle can be based on a most conservative of the options.

By utilizing the collision avoidance algorithm, the vehicle can be controlled to avoid the collision without updating steering inputs (e.g., without requiring a lane change by the vehicle). By controlling the vehicle to stop or slow down, the object that is moving in an oncoming direction can be allowed to safely continue along the object trajectory and/or pass by the vehicle. The object can continue its trajectory and/or pass by the vehicle even if the environment associated with the vehicle is constricted. These and other improvements to the operation of the vehicle are discussed herein.

The techniques discussed herein can improve a functioning of a computing device in a number of additional ways. In some cases, the collision avoidance algorithm can allow rapid evaluation of trajectories to determine collision probabilities along such a trajectory. Using simple geometric models and probability distributions allows for simple calculations that accurately represent risk associated with such trajectories. Accordingly, such the collision avoidance algorithm can be run in parallel to evaluate a plurality of trajectories and/or actions for safely guiding the vehicle, thereby improving safety outcomes and traffic flow in general. The use of such a strategy can improve computer performance requiring less memory, as well as having a decreased processing requirement, thus enabling such a system to be employed in real world vehicle safety systems having to make critical safety decisions in short amounts of time with limited amounts of processing power and memory.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system configure to input data to determine movement associated with objects in an environment. Further, although discussed in the context of a road with a constricted area, the techniques can be applicable to any type or road and are not limited to specific examples discussed herein. Additionally, the techniques described herein can be used with real data (e.g., captured using sensor(s)), simulated data (e.g., generated by a simulator), or any third of the two.

FIG. 1 is a pictorial flow diagram of an example process of determining a collision probability and controlling a vehicle based at least in part on the collision probability.

An operation 102 can include determining a vehicle trajectory and an object trajectory. The vehicle trajectory and the object trajectory can be determined based on sensor data received by one or more sensors on the vehicle. Examples of vehicle trajectories and object trajectories are discussed in, for example, U.S. patent application Ser. No. 16/151,607 titled "Trajectory Prediction On Top-Down Scenes" and filed Oct. 4, 2018, which is incorporated by reference herein in its entirety, and in, for example, U.S. patent application Ser. No. 15/843,512 titled "Trajectory Generation Using Curvature Segments" and filed Dec. 15, 2017, which is incorporated by reference herein in its entirety. In some examples, the vehicle and object may be positioned in a constricted area of the environment. The vehicle can be travelling on a road and may be moving in a direction that is opposite (e.g., oncoming) to movement of the object travelling on the road. At least a portion of the road on which the vehicle and the object are positioned can be at least partially constricted (e.g., by a double parked vehicle, a door opening into traffic, etc.).

An example 104 illustrates an environment in which a vehicle 106 an object 108 are traversing the environment. The vehicle 106 and the object 108 can each be at a starting position. The vehicle 106 can have a vehicle trajectory 110, while the object 108 can be associated with an object trajectory 112.

An operation 114 can include determining a collision probability associated with the vehicle 106 and the object 108. For example, the operation 114 can include advancing (e.g., simulating) the movement of the vehicle 106 and the object 108 along the predicted trajectories 110 and 112, respectively. As illustrated in an example 116, a collision probability can be determined at a location 118. In some examples, the collision probability can be determined to be above a collision probability threshold. In some examples, this collision probability threshold can be a first threshold that triggers the start of a "backtracking" algorithm.

In some examples, the collision probability can be associated with a predicted intersection associated with the vehicle 106 and the object 108 (e.g., a predicted intersection at a time $T_N$). The predicted intersection can be associated with the location of the object 108 at the constricted portion of the road.

An example 116 illustrates an environment in which the vehicle 106 the object 108 are traversing the environment at predicted locations associated with the predicted intersection. The vehicle 106 can be associated with a predicted location (e.g., location S) 118 at the predicted intersection. The object 108 can be associated with a predicted time (e.g., time $T_N$) 120 at the predicted intersection.

An operation 122 can include determining updated predicted location(s) associated with the vehicle and the object. The updated predicted location associated with the vehicle 106 can be determined by simulating "stepping backward" the vehicle trajectory 110 (e.g., simulating the vehicle slowing down (e.g., deceleration)). In those examples, the "stepping backward" the vehicle trajectory 110 can include determining vehicle characteristics associated with a new predicted location prior to the predicted location 118.

The updated predicted location associated with the object 108 can be determined by simulating "stepping forward" the object trajectory 112 (e.g., simulating the object changing its location). In those examples, the "stepping forward" the object trajectory 112 can include determining object characteristics associated with the object at a new time subsequent to the predicted time 120.

An example 124 illustrates a simulated instance in which the vehicle 106 and the object 108 are represented at updated predicted locations. The vehicle 106 can be associated with an updated predicted location (e.g., location S–D (e.g., location S minus some distance D)) 126. The updated predicted location 126 associated with the vehicle 106 can be determined by simulating "stepping backward" the vehicle trajectory 110. The updated predicted location of the object 108 can be associated with an updated predicted time (e.g., time $T_{N+M}$ (e.g., time M plus an additional time N)) 128. The updated predicted location associated with the object 108 at the updated predicted time 128 can be determined by simulating "stepping forward" the object trajectory 112.

An operation 130 can include determining whether a collision probability is above a collision probability threshold. In some examples, this collision probability threshold can be a second threshold different than the threshold (e.g., first threshold) discussed above with respect to operation 114. In some examples, this threshold can be considered to be an "end" threshold for terminating the "backtracking" algorithm. The second threshold can be less than or equal to the first threshold. A number of collision probabilities determined by the collision avoidance algorithm is not limited to two, and can include any number of collision probabilities associated with respective predicted locations associated with the vehicle and respective predicted times associated with the object. As the number of collision probabilities increases (or a distance between locations for determining collision probability decreases below a threshold value), a probability approach associated with the collision probabilities determined utilized by the collision avoidance algorithm approaches a continuous probability approach. The continuous probability approach includes a continuous probability of collision associated with each point on a continuous path by "backtracking" from the first predicted location of the vehicle and to the vehicle starting position of the vehicle. The operation 130 can determine whether the collision probability is above the collision probability threshold for each collision probability associated with the continuous path, until the collision probability that is equal to or less than the second threshold is determined.

An operation 132 can include determining an updated vehicle trajectory. The updated vehicle trajectory can be determined based on a new acceleration profile. The new acceleration profile can be determined based on collision probabilities (e.g., the collision probability as determined in operation 114). The new acceleration profile can include an acceleration (e.g., deceleration) of the vehicle. In some examples, the acceleration can include slowing down or stopping the vehicle to arrive at, or before, a position (e.g., a first position associated with the vehicle stopping or having a minimum velocity or a second position associated with the vehicle slowing down).

Therefore, and as described herein, a vehicle that approaches an object on a road can be controlled to reduce a risk of a collision with the object. The risk of the collision can be reduced based on a predicted location of the object potentially resulting in a collision between the vehicle and the object. The predicted location of the object can be based on a trajectory of the object changing due to a constricted area in a portion of the road at which the object is travelling. The collision probability can be determined based on a predicted intersection between the vehicle and the object. The predicted intersection can be associated with a predicted location of the vehicle and the predicted location of the object. The predicted intersection can be utilized to simulate "stepping backward" the vehicle in time and "stepping forward" the object in location. The simulating of the vehicle and the object can be repeated to determine updated predicted locations of the vehicle and the object based on the collision probability being below the second threshold. The updated predicted locations can be associated with a reduced risk of collision between the vehicle and the object. The vehicle can be controlled based on the updated predicted locations. The vehicle can be controlled to slow down or stop to arrive at, or before, the updated predicted location associated with the vehicle. By slowing down or stopping the vehicle, the object can be allowed to pass by the vehicle.

Figure 2:
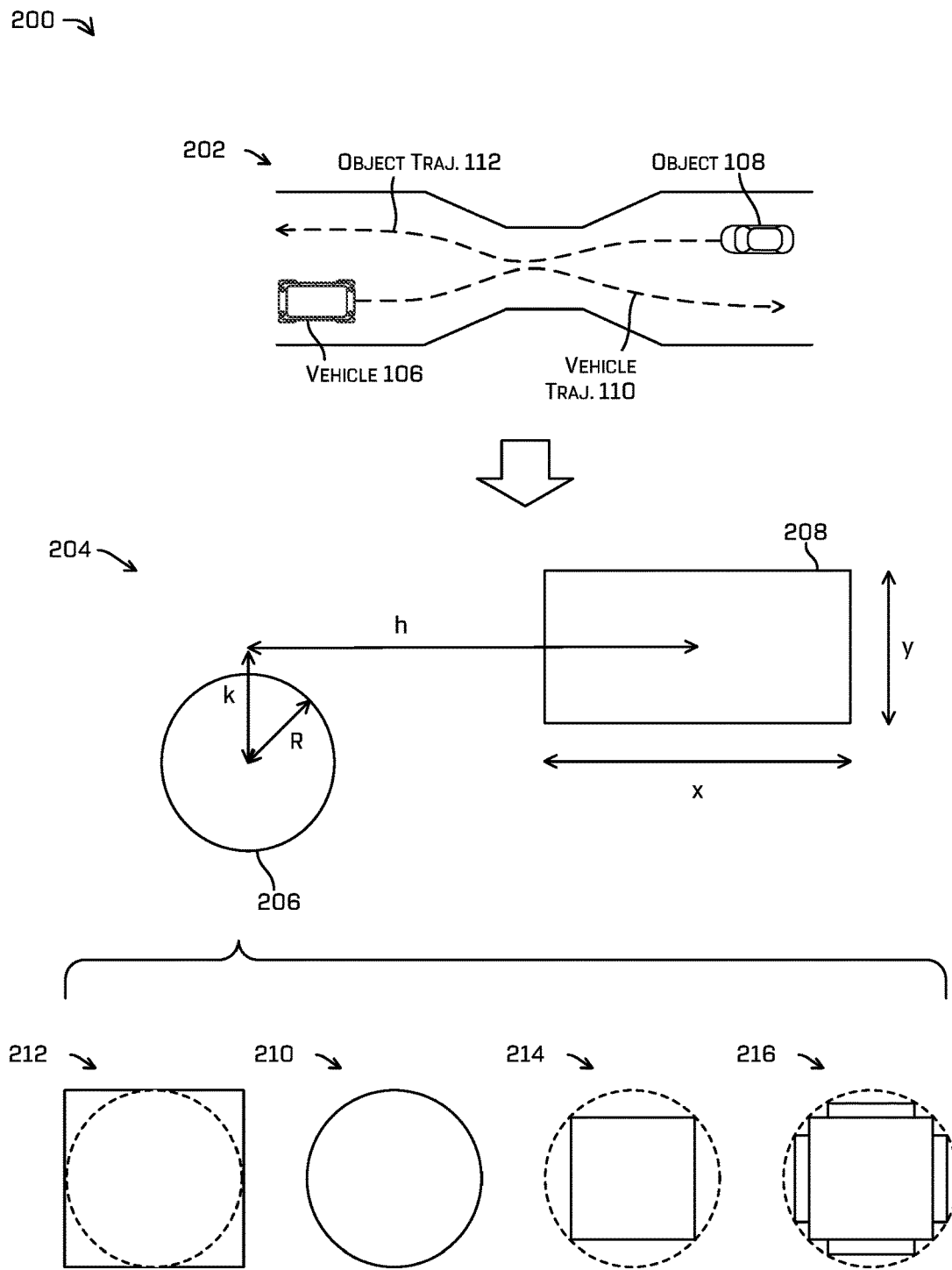
FIG. 2 is an illustration of example models of the vehicle and an object for determining a collision probability associated with the vehicle and the object.

FIG. 2 is an illustration of example models of the vehicle and an object for determining a collision probability associated with the vehicle and the object.

As illustrated in FIG. 2, an example representation 202 can include a vehicle with a vehicle trajectory and an object with an object trajectory. In some instances, the example representation 202 can include the vehicle 106, the object 108, the vehicle trajectory 110, and the object trajectory 112, as discussed above in connection with FIG. 1.

An example representation 204 illustrates a geometric model utilized to determine a collision probability associated with the vehicle 106. The geometric model can include a geometric representation 206 associated with the vehicle 106 and a geometric representation 208 associated with the object 108. In some examples, the collision probability can be determined based on a distance between the geometric representation 206 and the geometric representation 208. In those examples, the collision probability can be determined based on an overlap between the geometric representation 206 and the geometric representation 208. The overlap can be associated with an intersection between the vehicle 106 and the object 108. The overlap can be determined in connection with uncorrelated probabilities in the x direction and y direction. The overlap can be utilized to determine an x-direction collision probability associated with an x-direction and a y-direction collision probability associated with a y-direction. The x-direction collision probability can be multiplied by the y-direction collision probability to determine the collision probability associated with the vehicle 106 and the object 108. Different models of the vehicle 106 can be utilized for ease of calculation, as discussed below in further detail. A machine learned model can be then utilized to determine a correction factor based on a monte carlo simulation.

In some examples, the vehicle 106 can be represented by a geometric representation 206, which is illustrated as a circle. A radius of the circle can be based on a width of the vehicle 106. In some examples, the center of the circle can be based on or associated with a center of the front bumper of the vehicle 106.

In some examples, the center of the geometric representation 206 can be determined to be closer to another portion of the vehicle 106 (e.g., closer to or further away from the center of the vehicle) to be provide a more conservative probability of collision with respect to that portion of the vehicle 106.

In some examples, the object 108 can be represented by a geometric representation 208, such as a rectangle. The rectangle can be based on an extent of the object (e.g., a width and length of the object).

In the example 204, an offset from a center of the representation 208 to a center of the representation 206 can be represented as a variable "k" in a first dimension and "h" in a second dimension.

The representation 208 can also be associated with cumulative distribution function(s) (e.g., normal distribution function(s)) representing a probability that the object 108 will be at a particular location at a particular time. The collision probability of the vehicle 106 colliding with the object 108 can be determined based on the x-direction collision probability associated with the x-direction and the y-direction collision probability associated with the y-direction. The x-direction collision probability of the vehicle 106 colliding with the object 108 can be determined based on the horizontal offset. The x-direction collision probability can be determined based on a mean, a standard deviation, and an area under a curve associated with the normal distribution function. The y-direction collision probability of the vehicle 106 colliding with the object 108 can be determined based on the vertical offset. The y-direction collision probability can be determined based on a mean, a standard deviation, and an area under a curve associated with the normal distribution function. The x-direction collision probability can be multiplied by the y-direction collision probability, to determine the collision probability associated with the vehicle 106 and the object 108.

In some examples, the collision probability between the vehicle 106 and the object 108 can be determined based on the vertical offset and the horizontal offset and the location probabilities, discussed above. An initial value of the collision probability can be determined to be associated with a predicted intersection between the vehicle 106 and the object 108. The initial value of the collision probability can be determined to be associated with an overlap of the geometrical representation 206 and the geometrical representation 208. The overlap can be determined based on the size of each of the vertical offset and the horizontal offset being less than or equal to the size of the radius of the geometrical representation 206. In some examples, a value of the collision probability can be determined to be a maximum value based on a maximum size of the overlap (e.g., the center of the geometrical representation 206 having a same predicted location as the center the geometrical representation 208). In those examples, the value of the collision probability can be determined to decrease based on a size of the overlap decreasing (e.g., the size of one or more of the vertical offset or the horizontal offset increasing).

In some examples, a collision probability associated with a position of each of the vehicle 106 and the object 108 can be determined based on the geometric representation 206, as illustrated in the example representations 210-216, and based on the geometric representation 208. The collision probability can be determined based on an overlap between the geometric representation 206, as illustrated in the example representations 210-216, and the geometric representation 208. The overlap associated with the position of each of the vehicle 106 and the object 108 can have a size based on an area of the geometric representation 206 and the probability distributions associated with the graphical representation 208.

Although the graphical representation 206 is discussed in the context of a circle, the vehicle 106 can be represented by other shapes (such as squares and/or rectangles) to reduce computational complexity. Additional models of the vehicle 106 are illustrated as examples, 212, 214, and 216.

The model 212 is represented as a square having dimensions based on the width of the circle. FIG. 2 illustrates the model 212 as a square encompassing the circle to illustrate the relative sizes of the models. Because the area of the model 212 is larger than the area of the circle 210, this model will overestimate the collision probability.

The model 214 is represented as a square having dimensions based on the width of the circle. FIG. 2 illustrates the model 214 as a square encompassed by the circle. Because the area of the model 214 is smaller than the area of the circle 210, this model will underestimate the collision probability.

The model 216 is represented as a square with a rectangle at each side of the square, the square having dimensions based on the width of the circle. FIG. 2 illustrates the model 216 as a square and rectangles encompassed by the circle. Because the area of the model 216 is smaller than the area of the circle 210, this model will underestimate the collision probability. Because the area of the model 216 is greater than the area of the model 214, an amount by which this model will underestimate the collision probability is less than an amount by which the model 214 will underestimate the collision probability. This model will estimate the collision probability more accurately than the model 214.

Although four examples of the geometric representation 206 have been discussed, the geometric representation 206 is not limited as such and can include any addition number of polygons (e.g., rectangles) in addition to the rectangles at each of the side of the square in the example 216. In some examples, the geometric representation 206 according to the example 216 can include a rectangle at each gap enclosed by each of the square, the circle, and the rectangle at each of the sides of the square.

In some examples, the collision probability associated with the position of each of the vehicle 106 and the object 108 can be determined as a combined collision probability, based on collision probabilities associated with more than one geometric representation 206. For example, using the model 212 to determine a collision probability results in an overestimate of the collision probability. Using the model 214 or 216 to determine the collision probability results in an underestimate of the collision probability. In some examples, these overestimates and underestimates can be combined to determine an aggregate or combined collision probability.

In some examples, the overestimates and underestimates can be adjusted by a correction factor to produce more accurate collision probabilities. In some examples, the correction factor can be generated by or based at least in part on a machine learned model trained to output correction factors based on the model used to represent the vehicle 106, the extent of the object 208, and the offsets between the vehicle 106 and the object 108. For example, a ground truth for training a machine learned model can be generated by simulations (e.g., monte carlo simulations) to evaluate simulations to determine where a collision was present or not. Based on a large number of samples (e.g., tens of thousands) a ground truth collision probability can be determined for particular model parameters. The correction factor can be learned based on a difference between the actual ground truth collision probability and the overestimates or underestimates, as described above. Although the collision probability can be determined based on the simulations as described above, it is not limited to such, and can be determined based on any other type of model. For instance, the collision probability can be determined based on a correction factor determined by utilizing a heuristic model. The heuristic model can utilize any combination of corrections and aggregations. By way of example, an initial collision probability associated with any type of geometric representation (e.g., any of the geometric representations 206) can be determined, then corrected with a correction factor that is determined based on the initial collision probability, and then aggregated with other collision probabilities (e.g., any collision probabilities associated with other geometric representations (e.g., any of the geometric representations 206)). By way of another example, an initial collision probability associated with any type of geometric representation can be determined, then aggregated with other collision probabilities, and then corrected with a correction factor that is determined based on the aggregated collision probabilities. By way of another example, an initial collision probability associated with any type of geometric representation can be determined, then corrected with a correction factor that is determined based on the initial collision probability, then aggregated with other collision probabilities, and then corrected with a corrected factor that is determined based on the aggregated collision probabilities, and so on.

Once a machine learned model is used to determine the correction factors, the correction factors can be determined by the machine learned model or represented in a static manner, such as in a lookup table. The correction factors can be predicted based on errors by fitting quadratic curves based on normal distribution functions associated with each of an overestimate collision probability and an underestimate collision probability to the errors. The correction factors can be utilized to determine an updated overestimate collision probability and an updated underestimate collision probability. The updated overestimate collision probability and the updated underestimate collision probability can be averaged together to determine an average collision probability associated with the positions of the vehicle 106 and the object 108. The average collision probability can provide a more accurate collision probability than either of the overestimate collision probability or the underestimate collision probability.

Therefore, and as described herein, a vehicle and an object can each be modeled as geometric representations. The vehicle can be modeled as a circle, a square encompassing a circle, a square encompassed by a circle, or a combination of a square and rectangles that is encompassed by a circle. The object can be modeled as a rectangle. The geometric representations can be utilized to predict an intersection associated with a predicted collision between the vehicle and the object. An overlap between the geometric representations at the overlap can be associated with the collision probability. The overlap can be utilized to overestimate the collision probability based on the vehicle being modeled as the square encompassing the circle. The overlap can be utilized to underestimate the collision probability based on the vehicle being modeled as the square encompassed by the circle. The overestimate and the underestimate of the collision probability can be combined to determine an average collision probability. The average collision probability can estimate the collision probability with greater accuracy than the overestimate and the underestimate of the collision probability. The vehicle can be controlled based on the average collision probability to reduce a risk of a collision with the object.

Figure 3:
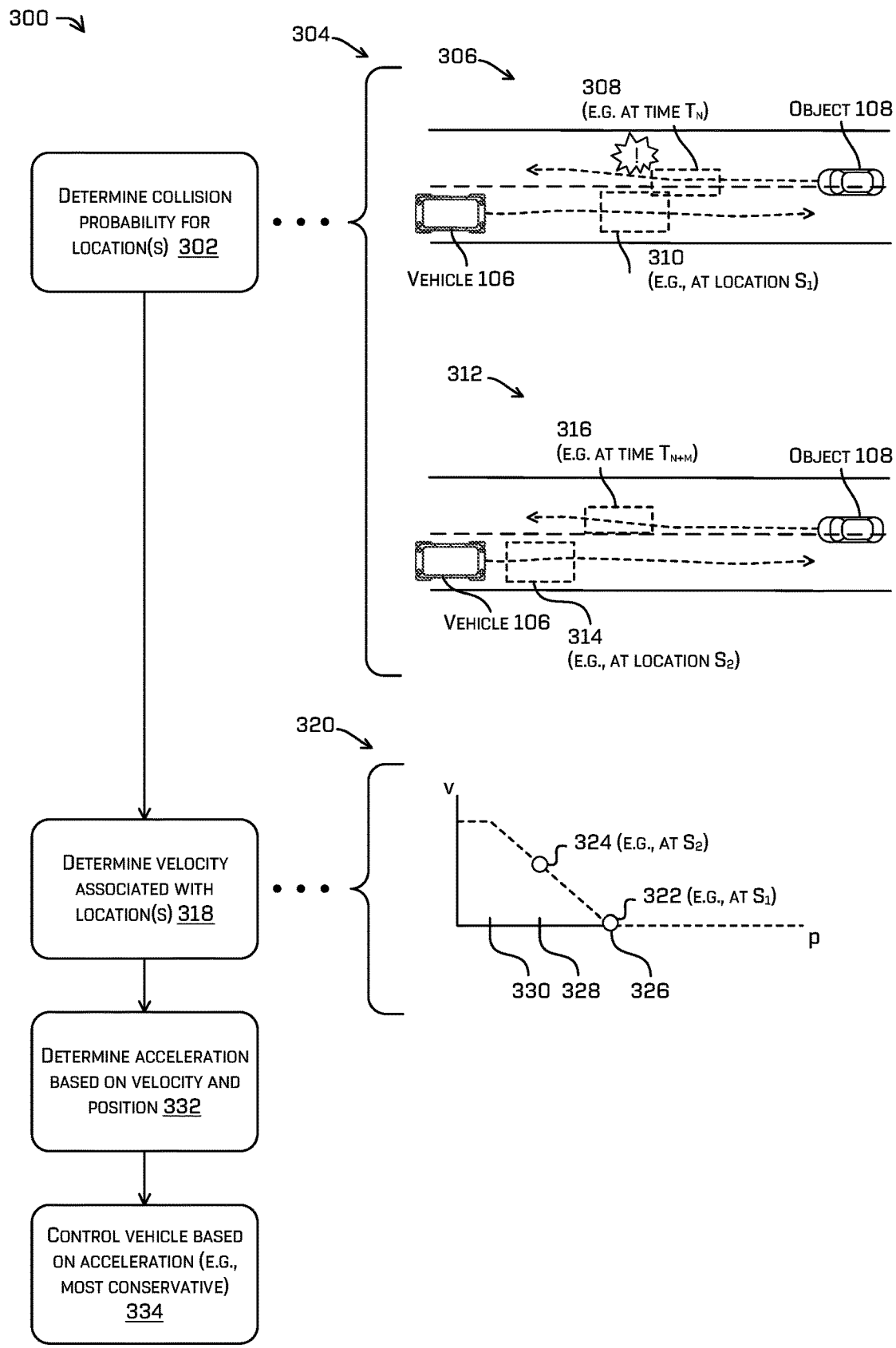
FIG. 3 is a pictorial flow diagram of an example process of determining an acceleration and controlling a vehicle based at least in part on the acceleration.

FIG. 3 is a pictorial flow diagram of an example process of determining an acceleration and controlling a vehicle based at least in part on the acceleration.

An operation 302 can include determining a collision probability for a location (e.g., predicted location) associated with each of a vehicle and an object. When the collision probability is above a first threshold value (e.g., a start threshold), the operation 302 can include executing the collision avoidance algorithm that includes "stepping back" the vehicle and "stepping forward" the object. When the collision probability is below a second threshold (e.g., an end threshold), the collision avoidance algorithm can end.

As noted above, the collision avoidance algorithm can be utilized to determine a collision probability based on simulating "stepping backward" the vehicle trajectory and "stepping forward" the object trajectory. The collision probability based on the "stepping backward" and the "stepping forward" can be determined based on an earlier predicted location associated with the vehicle and a subsequent predicted time associated with the object. The collision avoidance algorithm can be utilized to continue simulating the "stepping backward" and the "stepping forward" until a collision probability is determined to be less than, or equal to, the second threshold (e.g., 10%).

An example 304 illustrates determining collision probabilities in accordance with the collision avoidance algorithm. Although two scenarios are shown, any number of scenarios can be simulated based on the collision probability being above the second threshold.

The example 304 can include a scenario 306 including an environment in which the collision probability can be determined at a time associated with a predicted intersection. The collision probability can be determined by utilizing the collision avoidance algorithm. The collision probability can be determined based on an initial time (e.g., $T_N$) 308 associated with the object 108 at a predicted intersection, and an initial predicted location (e.g., $S_1$) 310 associated with the vehicle 106 at the predicted intersection. In some examples, the collision probability can be determined to be above a first threshold that triggers the start of a "backtracking" algorithm.

The example 304 can include a scenario 312 including an environment in which a collision probability can be determined at a subsequent time to the time associated with the predicted intersection. The collision avoidance algorithm can be utilized to determine a collision probability based on simulating "stepping backward" the vehicle trajectory and "stepping forward" the object trajectory. The collision probability based on the "stepping backward" and the "stepping forward" can be determined based on an earlier predicted location (e.g., $S_2$) 314 associated with the vehicle 106 and a subsequent predicted time ($T_{N+M}$) 316 associated with the object 108. The collision avoidance algorithm can determine whether the collision probability is less than, or equal to, the second threshold for terminating the "backtracking" algorithm.

An operation 318 can include determining a velocity associated with the vehicle at each of the initial predicted location and the earlier predicted location. In some examples, the velocity and the collision probability associated with the initial predicted location can be determined based on the collision probability being determined to be above the first threshold. The velocity and the collision probability associated with the earlier predicted location can be determined based on the interpolation between the velocity associated with the vehicle at the first threshold (e.g., zero velocity) and the velocity associated with the vehicle at the second threshold (e.g., the velocity of the original vehicle trajectory). As noted above, the first threshold can be associated with the vehicle being stopped. The second threshold can be associated with the vehicle maintaining a velocity (e.g., a velocity not being changed from the velocity of original vehicle trajectory). In some examples, the "backtracking" algorithm can include a minimum velocity below which the vehicle does not move. The collision avoidance algorithm can be associated with the minimum velocity. In those examples, the first threshold can be associated with movement of the vehicle at the minimum velocity instead of the zero velocity.

An example 320 illustrates a graph plotting velocities of the vehicle with respect to a collision probability. A velocity 322 associated with the vehicle 106 at the initial predicted location (e.g., $S_1$) 310 can be determined. A velocity 324 associated with the vehicle 106 at the earlier predicted location (e.g., $S_2$) 314 can be determined. The collision avoidance algorithm can be utilized to determine a collision probability 326 associated with the velocity 322 associated with the vehicle 106 at the initial predicted location 310. The collision avoidance algorithm can be utilized to determine a collision probability 328 associated with the velocity 324 associated with the vehicle 106 at the earlier predicted location 314. The velocity 324 and the collision probability 328 associated with the earlier predicted location 310 can be determined based on the interpolation between the velocity 322 associated with the vehicle 106 at the first threshold and the velocity associated with the vehicle (e.g., the velocity of the original vehicle trajectory) at the second threshold. The interpolation can include an interpolation of any type, such as, a linear interpolation, a quadratic interpolation, etc. As noted above, the first threshold can be associated with the vehicle being stopped or with movement of the vehicle at the minimum velocity. The second threshold can be associated with the vehicle maintaining a velocity (e.g., not changing a velocity).

An operation 332 can include determining an acceleration based on a velocity and a current position (e.g., start position) associated with the vehicle. The acceleration to control the vehicle can include a first acceleration utilized to control the vehicle to have a first velocity when the vehicle reaches a first position. In some examples, the first acceleration can be utilized to stop the vehicle or control the vehicle to have a first velocity (e.g., a minimum velocity (e.g., 0 m/s, 1 m/s, 2 m/s, etc.)) at the first position. Alternatively, the acceleration can include a second acceleration utilized to control the vehicle to slow down to have a second velocity at a second position. The acceleration to control the vehicle can include a most conservative acceleration associated with a position determined by the collision avoidance algorithm to be closest to the current position. The most conservative acceleration can include the first acceleration associated with the first position based on the first position being closer to the current position than the second position, or vice versa.

An operation 334 can include controlling the vehicle based on an acceleration (e.g., a most conservative acceleration). In some examples, the most conservative acceleration can be determined as the acceleration associated with the vehicle travelling a least amount of distance in a same amount of time. The most conservative acceleration can be determined as the acceleration associated with the vehicle stopping and not travelling beyond a position that results in a shortest distance between the position of the vehicle after slowing or stopping and the current position of the vehicle. In some examples, the most conservative acceleration can include a first acceleration associated with a first position based on the first position being closer to the current position than a second position. In some examples, the most conservative acceleration can include a second acceleration associated with a second position based on the second position being closer to the current position than first position. The first acceleration can be associated with the vehicle stopping or being controlled to have a first velocity (e.g., minimum velocity) at the first position. Alternatively, the second acceleration can be associated with the vehicle being controlled to slow down to have a second velocity at the second position.

Therefore, and as described herein, the collision avoidance algorithm can be utilized to determine collision probabilities as well as velocities and/or accelerations associated with the vehicle. The acceleration utilized to control the vehicle can be a most conservative acceleration, including i) stopping the vehicle or slowing the vehicle to a minimum velocity, ii) slowing the vehicle to a velocity determined by interpolation, or iii) allowing the vehicle to continue at the velocity of the original vehicle trajectory. The movement of the vehicle in the forward direction is optimized while determining the risk of collision is not high due to the object moving out of the lane (e.g., the object returning to the lane adjacent to the lane in which the vehicle is positioned).

Figure 4A:
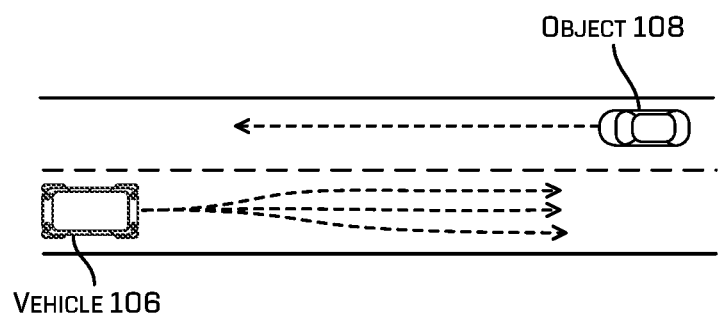
FIGS. 4A and 4B are illustrations of example vehicle trajectories and actions that can be selected based on a collision probability associated with a vehicle.
Figure 4B:
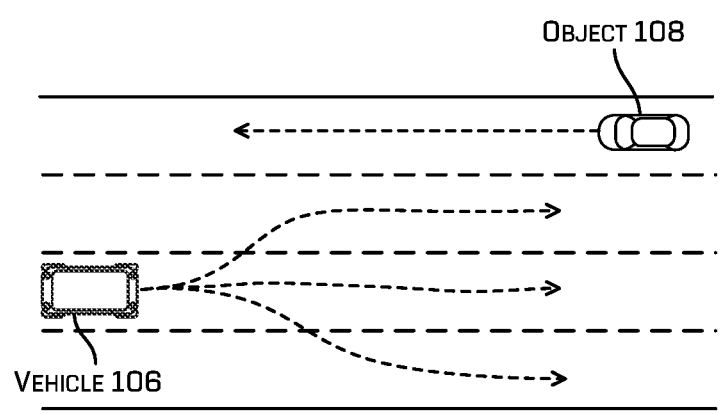

FIGS. 4A and 4B are illustrations of example vehicle trajectories and actions that can be selected based on a collision probability associated with a vehicle. The vehicle trajectory can be associated with the vehicle 106 and the object trajectory can be associated with the object 108, as discussed above in connection with FIG. 1.

As illustrated in FIG. 4A, a vehicle planning system can determine a plurality of trajectories for the vehicle to traverse while in a single lane. That is, a planning system can consider a plurality of trajectories based on a vehicle location in an environment. Each trajectory can be evaluated by the collision avoidance algorithm to determine safe operation of the vehicle throughout the environment. In some examples, the acceleration determined by the techniques discussed herein can be used when evaluating a cost associated with a trajectory, and accordingly, a trajectory can be selected or determined based on a lowest cost. For example, a trajectory biased closer to the object 108 can have a reduced velocity because of an increased collision probability. Accordingly, a trajectory biased away from the object 108 can be selected because it results in a higher velocity (e.g., and reduced travel time), absent other considerations.

FIG. 4B illustrates a similar operation whereby different actions (e.g., change lanes to the left, stay in lane, change lanes to the right) can be evaluated based on the collision avoidance algorithm, as discussed herein.

Therefore, and as described herein, the collision avoidance algorithm can be utilized to make more complex determinations utilized to control the vehicle. The vehicle can be controlled to change positions within a lane in which the vehicle is positioned, if a road with the lane does not include other lanes having traffic movement in the same direction. Alternatively, the vehicle can be controlled to change lanes instead of slowing down or stopping, if the cost of changing lanes is lower than the cost of staying in the lane. The cost of change lanes can be lower if the vehicle can be controlled to have a higher velocity by changing lanes than by staying in the same lane.

Figure 5:
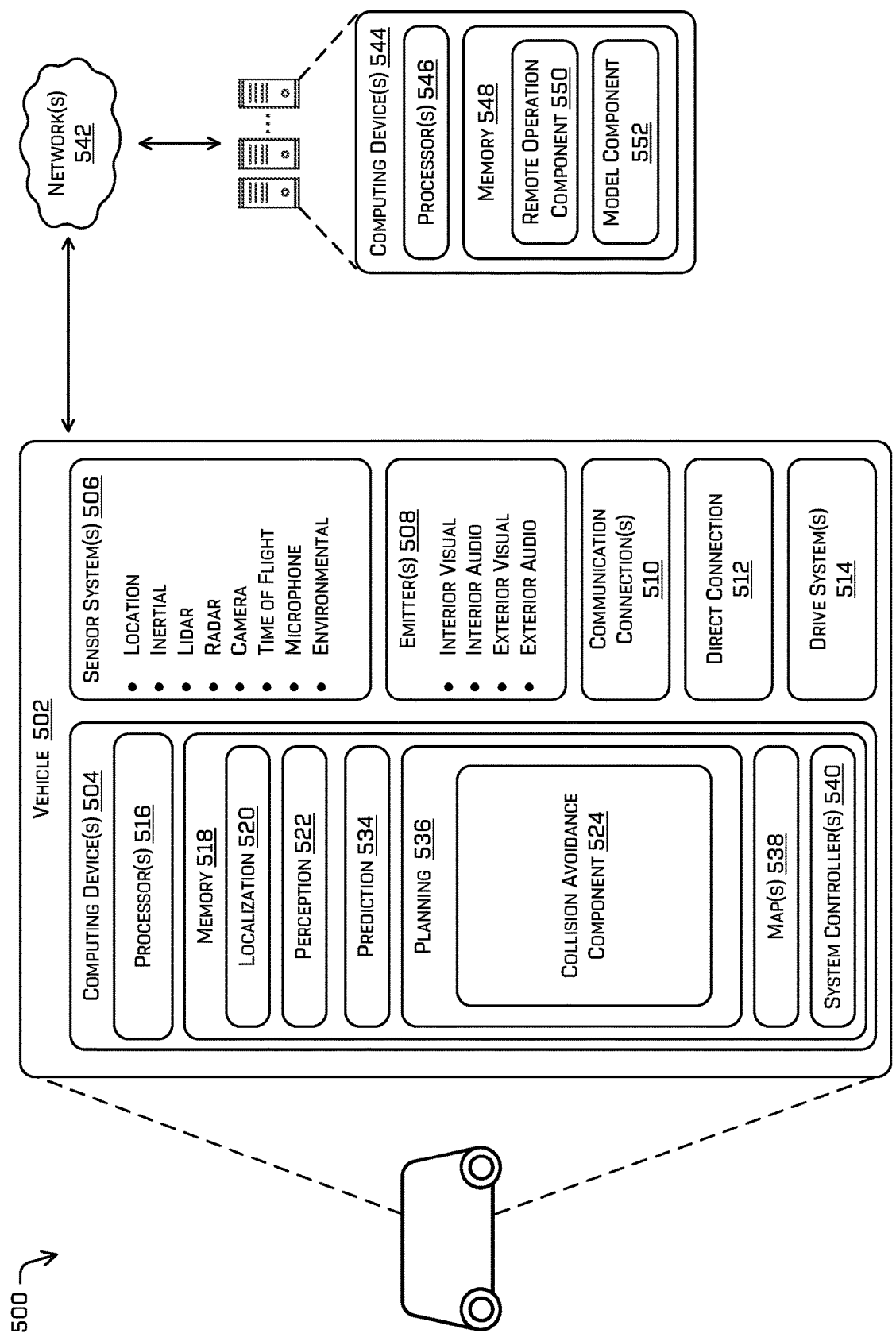
FIG. 5 is a block diagram of an example system for implementing the techniques described herein.

FIG. 5 is a block diagram of an example system for implementing the techniques described herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it can not include a driver and/or controls for driving the vehicle 502, such as a steering wheel, an acceleration pedal, and/or a brake pedal. This is merely an example, and the systems and methods described herein can be incorporated into any ground-borne, airborne, or water-borne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which can comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 542 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a localization component 520, a perception component 522, a prediction component 534, a planning component 536 comprising a collision avoidance component 524, a maps component 538, and one or more system controller(s) 540. Though depicted as residing in the memory 518 for illustrative purposes, it is contemplated that the localization component 520, the perception component 522, the collision avoidance component 524, the prediction component 534, the planning component 536, the maps component 538, and the one or more system controller(s) 540 can additionally, or alternatively, be accessible to the computing device 504 (e.g., stored in a different component of vehicle 502) and/or be accessible to the vehicle 502 (e.g., stored remotely).

In memory 518 of the computing device 504, the localization component 520 can include functionality to receive data from the sensor system(s) 506 to determine a position of the vehicle 502. For example, the localization component 520 can include and/or request/receive a three-dimensional map of an environment and can continuously determine a location of the autonomous vehicle within the map. In some instances, the localization component 520 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 520 can provide data to various components of the vehicle 502 to determine an initial position of an autonomous vehicle for generating a trajectory, as discussed herein.

The perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 522 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 522 can use perception algorithms to determine a perception-based bounding box associated with an object in the environment based on sensor data. For example, the perception component 522 can receive image data and classify the image data to determine that an object is represented in the image data. Then, using detection algorithms, the perception component 522 can generate a two-dimensional bounding box and/or a perception-based three-dimensional bounding box associated with the object. The perception component 522 can further generate a three-dimensional bounding box associated with the object. As discussed above, the three-dimensional bounding box can provide additional information such as a location, orientation, pose, and/or size (e.g., size, width, height, etc.) associated with the object.

The perception component 522 can include functionality to store perception data generated by the perception component 522. In some instances, the perception component 522 can determine a track corresponding to an object that has been classified as an object type. For purposes of illustration only, the perception component 522, using sensor system(s) 506 can capture one or more images of an environment. The sensor system(s) 506 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The collision avoidance component 524 can include functionality to utilize a collision avoidance algorithm to calculate or otherwise determine the acceleration to control the vehicle. The collision avoidance component 524 can determine a collision probability associated with a vehicle and an object. The collision avoidance component 524 can determine the collision probability based on a predicted intersection associated with the vehicle the object. The collision avoidance component 524 can determine the collision probability is equal to, or greater than, a first threshold. The collision avoidance component 524 can simulate "stepping backward" the vehicle trajectory and "stepping forward" the object trajectory. The collision avoidance component 524 can simulate the "stepping backward" and the "stepping forward" to determine a collision probability associated with an updated predicted location associated with the vehicle and an updated predicted time associated with the object. The collision avoidance component 524 can iteratively repeat the simulation of the "stepping backward" and the "stepping forward" to determine updated predicted locations of the vehicle and the object based on the collision probability being below the second threshold.

The collision avoidance component 524 can determine velocities of the vehicle with respect to a collision probability. A velocity associated with the vehicle at an initial predicted location can be determined. A velocity associated with the vehicle at an earlier predicted location can be determined based on interpolation between the velocity associated with the vehicle at the initial predicted location and an original velocity associated with the vehicle at a current position (e.g., start position).

The collision avoidance component 524 can determine an acceleration to control the vehicle based on a velocity and the current position associated with the vehicle. The acceleration to control the vehicle can include a first acceleration utilized to control the vehicle to have a first velocity when the vehicle reaches a first position. In some examples, the first acceleration can be utilized to stop the vehicle or control the vehicle to have a first velocity (e.g., a minimum velocity (e.g., 0 m/s, 1 m/s, 2 m/s, etc.)) at the first position. Alternatively, the acceleration can include a second acceleration utilized to control the vehicle to slow down to have a second velocity at a second position. The acceleration to control the vehicle can include a most conservative acceleration associated with a position determined by the collision avoidance algorithm to be closest to the current position. The most conservative acceleration can include the first acceleration associated with the first position based on the first position being closer to the current position than the second position, or vice versa.

The prediction component 534 can generate one or more probability maps representing prediction probabilities of possible locations of one or more objects in an environment. For example, the prediction component 534 can generate one or more probability maps for vehicles, pedestrians, animals, and the like within a threshold distance from the vehicle 502. In some instances, the prediction component 534 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 536 can determine a path for the vehicle 502 to follow to traverse through an environment. For example, the planning component 536 can determine various routes and paths and various levels of detail. In some instances, the planning component 536 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 536 can generate an instruction for guiding the autonomous vehicle along at least a portion of the route from the first location to the second location. In at least one example, the planning component 536 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level can be selected to operate the vehicle.

In other examples, the planning component 536 can alternatively, or additionally, use data from the perception component 522 and/or the prediction component 534 to determine a path for the vehicle 502 to follow to traverse through an environment. For example, the planning component 536 can receive data from the perception component 522 and/or the prediction component 534 regarding objects associated with an environment. Using this data, the planning component 536 can determine a route to travel from a first location (e.g., a current location) to a second location (e.g., a target location) to avoid objects in an environment. In at least some examples, such a planning component 536 can determine there is no such collision free path and, in turn, provide a path which brings vehicle 502 to a safe stop avoiding all collisions and/or otherwise mitigating damage.

The memory 518 can further include one or more maps 538 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 538 can include at least one map (e.g., images and/or a mesh). In some examples, the vehicle 502 can be controlled based at least in part on the map(s) 538. That is, the map(s) 538 can be used in connection with the localization component 520, the perception component 522 (and sub-components), the prediction component 534, and/or the planning component 536 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 can include one or more system controller(s) 540, which can be configured to control steering, propulsion, braking, safety, emitters, communication, and other systems of the vehicle 502. These system controller(s) 540 can communicate with and/or control corresponding systems of the drive system(s) 514 and/or other components of the vehicle 502, which can be configured to operate in accordance with a path provided from the planning component 536.

The vehicle 502 can connect to computing device(s) 544 via network 542 and can include one or more processor(s) 546 and memory 548 communicatively coupled with the one or more processor(s) 546. In at least one instance, the one or more processor(s) 546 can be similar to the processor(s) 516 and the memory 548 can be similar to the memory 518. In the illustrated example, the memory 548 of the computing device(s) 544 stores a remote operation component 550 and/or a model component 552. In at least one instance, the model component 552, after empirical testing and/or simulations, can generate ML models to be used by the perception component 522, as discussed herein. Though depicted as residing in the memory 548 for illustrative purposes, it is contemplated that the remote operation component 550 and the model component 552 can additionally, or alternatively, be accessible to the computing device(s) 544 (e.g., stored in a different component of computing device(s) 544 and/or be accessible to the computing device(s) 544 (e.g., stored remotely).

The model component 552 can include functionality to generate models for determining heights/classifications of multi-channel image data, as discussed herein.

The processor(s) 516 of the computing device 504 and the processor(s) 546 of the computing device(s) 544 can be any suitable processor capable of executing instructions to process data and perform operations as described herein. By way of example and not limitation, the processor(s) 516 and 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 548 of the computing device(s) 544 are examples of non-transitory computer-readable media. The memory 518 and 548 can store an operating system and one or more software applications, instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 548 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Figure 6:
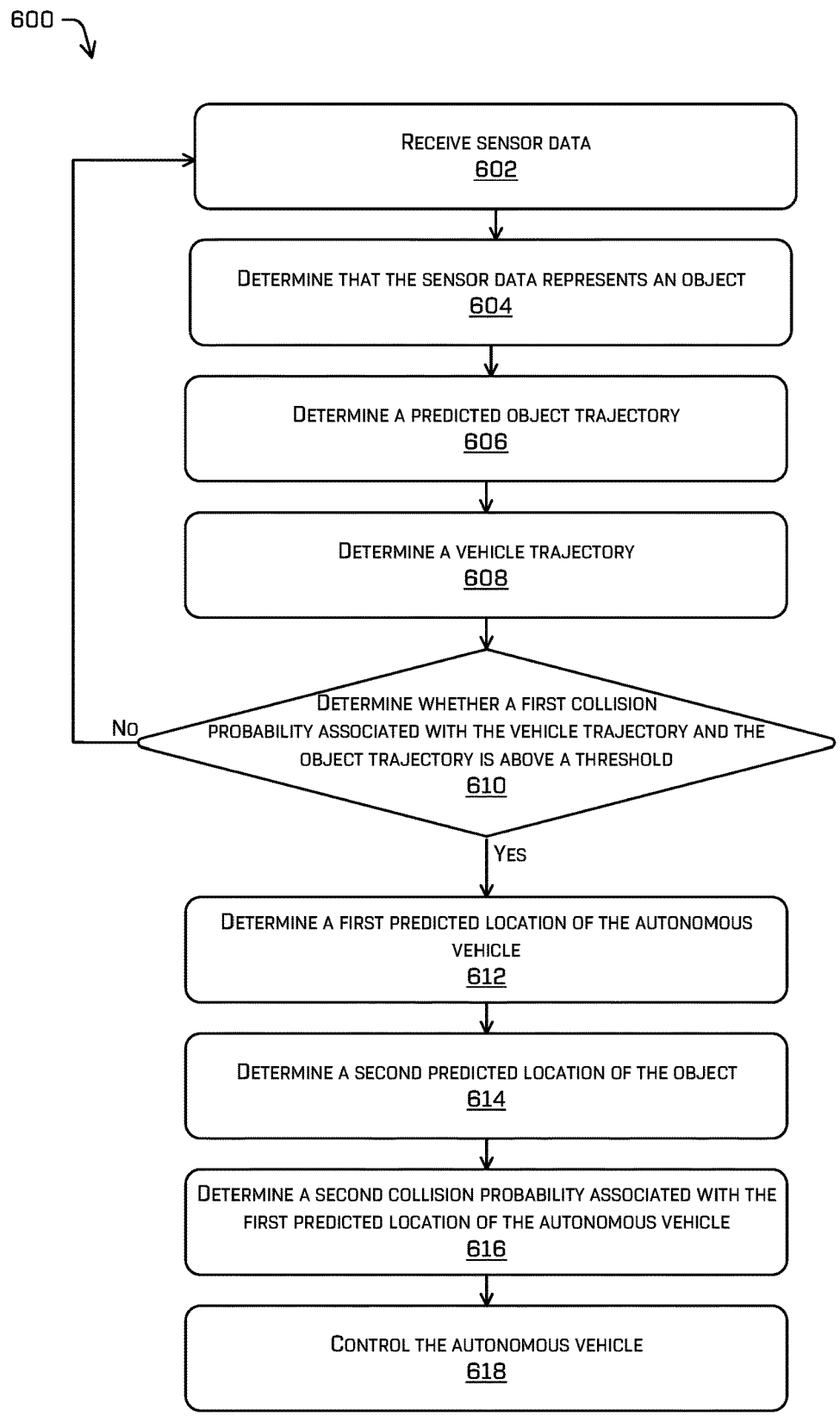
FIG. 6 is an example process for determining a collision probability and controlling a vehicle based at least in part on the collision probability.

FIG. 6 is an example process for determining a collision prediction and controlling an autonomous vehicle based at least in part on the collision prediction.

At operation 602, the process can include receiving sensor data captured by a sensor on an autonomous vehicle in an environment. The sensor data can include data associated with an environment through the autonomous vehicle is travelling, based on the autonomous vehicle being positioned at a vehicle starting position.

At operation 604, the process can include determining that the sensor data represents an object in the environment. The sensor data can include data associated with the objecting being positioned at an object starting position.

At operation 606, the process can include determining a predicted object trajectory associated with the object. The predicted object trajectory can include movement of the object.

At operation 608, the process can include determining a vehicle trajectory associated with the autonomous vehicle. The vehicle trajectory can include movement of the autonomous vehicle.

At operation 610, the process can include determining whether a first collision probability associated with the vehicle trajectory and the object trajectory is above a threshold. This threshold can be a first threshold that triggers the start of a "backtracking" algorithm.

At operation 612, the process can include determining a first predicted location of the autonomous vehicle. The first predicted location can be associated with a predicted intersection of the vehicle at a constricted portion of a road.

At operation 614, the process can include determining a second predicted location of the object, the third time after the first time. The second predicted location of the object can be associated with the predicted intersection of the vehicle at a predicted time.

At operation 616, the process can include determining a second collision probability associated with the first predicated location of the autonomous vehicle. The second collision probability can be determined by utilizing a collision avoidance algorithm to simulate "stepping backward" the vehicle trajectory and "stepping forward" the object trajectory. The second collision probability can be determined based on an updated predicted location (e.g., the first predicted location minus some distance) associated with the vehicle and an updated predicted time (e.g., the predicted time plus an additional time) associated with the object.

At operation 618, the process can include controlling the autonomous vehicle based on a new acceleration profile. The new acceleration profile can be determined based on collision probabilities (e.g., the first collision probability or the second collision probability). The new acceleration profile can include an acceleration (e.g., deceleration) of the vehicle. In some examples, the acceleration can include slowing down or stopping the vehicle to arrive at, or before, an updated predicted location.

Example Clauses

A. A system comprising: one or more processors; and one or more computer-readable media storing instructions executable by the one or more processors, wherein the instructions, when executed, cause the system to perform operations comprising: receiving sensor data captured by a sensor on an autonomous vehicle in an environment; determining that the sensor data represents an object in the environment; determining a predicted object trajectory associated with the object; determining a vehicle trajectory associated with the autonomous vehicle; determining, based at least in part on the predicted object trajectory and the vehicle trajectory, a first collision probability associated with the autonomous vehicle at a first location and the object at a first time; determining that the first collision probability meets or exceeds a threshold value; determining a first predicted location of the autonomous vehicle at a second location along the vehicle trajectory, the second location before the first location; determining a second predicted location of the object at a second time along the predicted object trajectory, the second time after the first time; determining, based at least in part on the first predicted location and the second predicted location, a second collision probability associated with the autonomous vehicle and the object, the second collision probability being less than or equal to the first collision probability; and controlling the autonomous vehicle based at least in part on the second collision probability.

B. The system of paragraph A, the operations further comprising: associating the first location with a first velocity; determining, based at least in part on an interpolation based on the first velocity, a second velocity associated with the autonomous vehicle at the second location; and determining, based at least in part on the first velocity, an acceleration associated with autonomous vehicle, wherein controlling the autonomous vehicle comprises controlling the autonomous vehicle based at least in part on the acceleration.

C. The system of paragraph A or B, the operations further comprising: determining the first collision probability based at least in part on a location probability distribution associated with the object.

D. The system of any of paragraphs A-C, the operations further comprising: determining the first collision probability based at least in part on: a first geometric model of the autonomous vehicle associated with overestimating an actual collision probability; and a second geometric model of the autonomous vehicle associated with underestimating the actual collision probability, wherein the first collision probability represents an aggregated collision probability based at least in part on the first geometric model and the second geometric model.

E. The system of any of paragraphs A-D, the operations further comprising: determining a third predicted location of the autonomous vehicle at a third location along the vehicle trajectory, the third location between the first location and the second location; determining a fourth predicted location of the object at a third time along the predicted object trajectory, the third time between the first time and the second time; determining, based at least in part on the third predicted location and the fourth predicted location, a third collision probability associated with the autonomous vehicle and the object; determining an acceleration associated with the third collision probability; and determining that the third collision probability meets or exceeds a second threshold value.

F: A method comprising: receiving sensor data captured by a sensor on a vehicle in an environment; determining that the sensor data represents an object in the environment; determining a first collision probability associated with a first predicted location of the vehicle and a second predicted location of the object at a first time; determining a third predicted location of the vehicle, the second predicted location before the first predicted location; determining a fourth predicted location of the object at a second time, the second time after the first time; determining, based at least in part on the third predicted location and the fourth predicted location, a second collision probability associated with the vehicle and the object; and controlling the vehicle based at least in part on the second collision probability.

G: The method of paragraph F, further comprising: receiving a predicted object trajectory associated with the object; and determining the second predicted location and the fourth predicted location based at least in part on the predicted object trajectory.

H: The method of paragraph F or G, further comprising: receiving a predicted vehicle trajectory associated with the vehicle; and determining the first predicted location and the third predicted location based at least in part on the predicted vehicle trajectory.

I: The method of any of paragraphs F-H, further comprising: representing the object with a geometric model comprising a location probability distribution associated with the object.

J: The method of paragraph I, wherein the geometric model is a first geometric model, the method further comprising: representing the vehicle as a second geometric model, wherein the first collision probability is based at least in part on the first geometric model and the second geometric model.

K: The method of any of paragraphs F-J, further comprising determining the first collision probability based at least in part on: a first geometric model of the vehicle associated with determining a first probability; and a second geometric model of the vehicle associated with determining a second probability; wherein the first collision probability represents an aggregated collision probability based at least in part on the first geometric model and the second geometric model.

L: The method of any of paragraphs F-K, further comprising: determining the first collision probability based at least in part on a correction factor.

M: One or more non-transitory computer-readable media storing instructions executable by a processor, wherein the instructions, when executed, cause the processor to perform operations comprising: receiving sensor data captured by a sensor on a vehicle in an environment; determining that the sensor data represents an object in the environment; determining a first collision probability associated with a first predicted location of the vehicle and a second predicted location of the object at a first time; determining a third predicted location of the vehicle, the second predicted location before the first predicted location; determining a fourth predicted location of the object at a second time, the second time after the first time; determining, based at least in part on the third predicted location and the fourth predicted location, a second collision probability associated with the vehicle and the object; and controlling the vehicle based at least in part on the second collision probability.

N: The one or more non-transitory computer-readable media of paragraph M, the operations further comprising: receiving a predicted object trajectory associated with the object; and determining the second predicted location and the fourth predicted location based at least in part on the predicted object trajectory.

O: The one or more non-transitory computer-readable media of paragraph M or N, the operations further comprising: receiving a predicted vehicle trajectory associated with the vehicle; and determining the first predicted location and the third predicted location based at least in part on the predicted vehicle trajectory.

P: The one or more non-transitory computer-readable media of any of paragraphs M-O, the operations further comprising: representing the object with a geometric model comprising a location probability distribution associated with the object.

Q: The one or more non-transitory computer-readable media of paragraph P, wherein the geometric model is a first geometric model, the operations further comprising: representing the vehicle as a second geometric model, wherein the first collision probability is based at least in part on the first geometric model and the second geometric model.

R: The one or more non-transitory computer-readable media of any of paragraphs M-Q, the operations further comprising determining the first collision probability based at least in part on: a first geometric model of the vehicle associated with determining a first probability; and a second geometric model of the vehicle associated with determining a second probability; wherein the first collision probability represents an aggregated collision probability based at least in part on the first geometric model and the second geometric model.

S: The one or more non-transitory computer-readable media of any of paragraphs M-R, the operations further comprising: determining the first collision probability based at least in part on a correction factor.

T: The one or more non-transitory computer-readable media of any of paragraphs M-S, wherein controlling the vehicle further comprises controlling the vehicle to slow or to stop, based at least in part on the second collision probability.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving sensor data captured by a sensor on an autonomous vehicle in an environment;
determining that the sensor data represents an object in the environment;
determining a predicted object trajectory associated with the object;
determining a vehicle trajectory associated with the autonomous vehicle;
determining, based at least in part on the predicted object trajectory and the vehicle trajectory, a first collision probability associated with the autonomous vehicle at a first location and the object at a first time;
determining that the first collision probability meets or exceeds a threshold value;
determining a first predicted location of the autonomous vehicle at a second location along the vehicle trajectory, the second location simulating stepping back the autonomous vehicle with respect to the first location;
determining a second predicted location of the object at a second time along the predicted object trajectory, the second time simulating stepping forward the object with respect to the first time;
determining, based at least in part on the first predicted location and the second predicted location, a second collision probability associated with the autonomous vehicle and the object, the second collision probability being less than or equal to the first collision probability; and
controlling the autonomous vehicle based at least in part on the second collision probability.

2. The system of claim 1, the operations further comprising:
associating the first location with a first velocity;
determining, based at least in part on an interpolation based on the first velocity, a second velocity associated with the autonomous vehicle at the second location; and
determining, based at least in part on the first velocity, an acceleration associated with autonomous vehicle,
wherein controlling the autonomous vehicle comprises controlling the autonomous vehicle based at least in part on the acceleration.

3. The system of claim 1, the operations further comprising:
determining the first collision probability based at least in part on a location probability distribution associated with the object.

4. The system of claim 1, the operations further comprising:
determining the first collision probability based at least in part on:
a first geometric model of the autonomous vehicle associated with overestimating an actual collision probability; and
a second geometric model of the autonomous vehicle associated with underestimating the actual collision probability,
wherein the first collision probability represents an aggregated collision probability based at least in part on the first geometric model and the second geometric model.

5. The system of claim 1, the operations further comprising:
determining a third predicted location of the autonomous vehicle at a third location along the vehicle trajectory, the third location between the first location and the second location;
determining a fourth predicted location of the object at a third time along the predicted object trajectory, the third time between the first time and the second time;
determining, based at least in part on the third predicted location and the fourth predicted location, a third collision probability associated with the autonomous vehicle and the object;
determining an acceleration associated with the third collision probability; and
determining that the third collision probability meets or exceeds a second threshold value.

6. A method comprising:
receiving sensor data captured by a sensor on a vehicle in an environment;
determining that the sensor data represents an object in the environment;
determining a first collision probability associated with a first predicted location of the vehicle and a second predicted location of the object at a first time;
determining a third predicted location of the vehicle, the second predicted location simulating stepping back the vehicle with respect to the first predicted location;
determining a fourth predicted location of the object at a second time, the second time simulating stepping forward the object with respect to the first time;
determining, based at least in part on the third predicted location and the fourth predicted location, a second collision probability associated with the vehicle and the object; and
controlling the vehicle based at least in part on the second collision probability.

7. The method of claim 6, further comprising:
receiving a predicted object trajectory associated with the object; and
determining the second predicted location and the fourth predicted location based at least in part on the predicted object trajectory.

8. The method of claim 6, further comprising:
receiving a predicted vehicle trajectory associated with the vehicle; and
determining the first predicted location and the third predicted location based at least in part on the predicted vehicle trajectory.

9. The method of claim 6, further comprising:
representing the object with a geometric model comprising a location probability distribution associated with the object.

10. The method of claim 9, wherein the geometric model is a first geometric model, the method further comprising:

representing the vehicle as a second geometric model, wherein the first collision probability is based at least in part on the first geometric model and the second geometric model.

11. The method of claim 6, further comprising determining the first collision probability based at least in part on:
  a first geometric model of the vehicle associated with determining a first probability; and
  a second geometric model of the vehicle associated with determining a second probability;
  wherein the first collision probability represents an aggregated collision probability based at least in part on the first geometric model and the second geometric model.

12. The method of claim 6, further comprising:
  determining the first collision probability based at least in part on a correction factor.

13. One or more non-transitory computer-readable media storing instructions executable by a processor, wherein the instructions, when executed, cause the processor to perform operations comprising:
  receiving sensor data captured by a sensor on a vehicle in an environment;
  determining that the sensor data represents an object in the environment;
  determining a first collision probability associated with a first predicted location of the vehicle and a second predicted location of the object at a first time;
  determining a third predicted location of the vehicle, the second predicted location simulating stepping back the vehicle with respect to the first predicted location;
  determining a fourth predicted location of the object at a second time, the second time simulating stepping forward the object with respect to the first time;
  determining, based at least in part on the third predicted location and the fourth predicted location, a second collision probability associated with the vehicle and the object; and
  controlling the vehicle based at least in part on the second collision probability.

14. The one or more non-transitory computer-readable media of claim 13, the operations further comprising:
  receiving a predicted object trajectory associated with the object; and
  determining the second predicted location and the fourth predicted location based at least in part on the predicted object trajectory.

15. The one or more non-transitory computer-readable media of claim 13, the operations further comprising:
  receiving a predicted vehicle trajectory associated with the vehicle; and
  determining the first predicted location and the third predicted location based at least in part on the predicted vehicle trajectory.

16. The one or more non-transitory computer-readable media of claim 13, the operations further comprising:
  representing the object with a geometric model comprising a location probability distribution associated with the object.

17. The one or more non-transitory computer-readable media of claim 16, wherein the geometric model is a first geometric model, the operations further comprising:
  representing the vehicle as a second geometric model, wherein the first collision probability is based at least in part on the first geometric model and the second geometric model.

18. The one or more non-transitory computer-readable media of claim 13, the operations further comprising determining the first collision probability based at least in part on:
  a first geometric model of the vehicle associated with determining a first probability; and
  a second geometric model of the vehicle associated with determining a second probability;
  wherein the first collision probability represents an aggregated collision probability based at least in part on the first geometric model and the second geometric model.

19. The one or more non-transitory computer-readable media of claim 13, the operations further comprising:
  determining the first collision probability based at least in part on a correction factor.

20. The one or more non-transitory computer-readable media of claim 13, wherein controlling the vehicle further comprises controlling the vehicle to slow or to stop, based at least in part on the second collision probability.

* * * * *